Oct. 17, 1944. R. T. WEIERBACH 2,360,456
VEHICLE DUMP BODY MOUNTING AND DUMP DOOR ACTUATING MECHANISM
Filed March 30, 1943 5 Sheets-Sheet 2
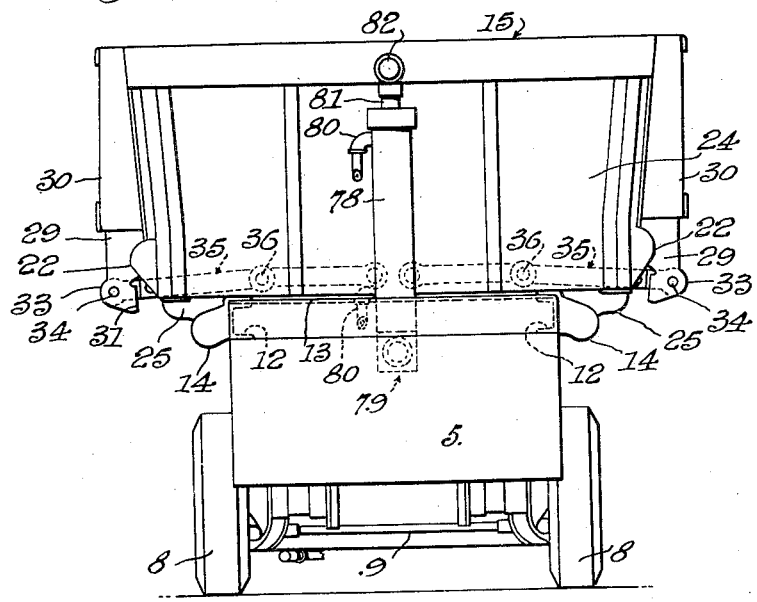
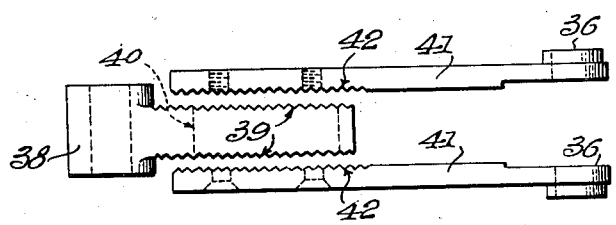
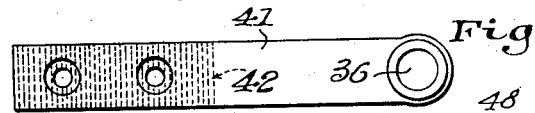
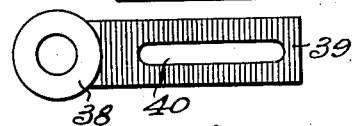
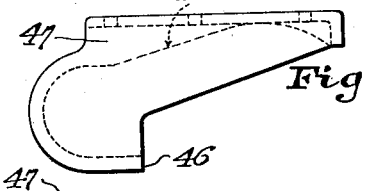
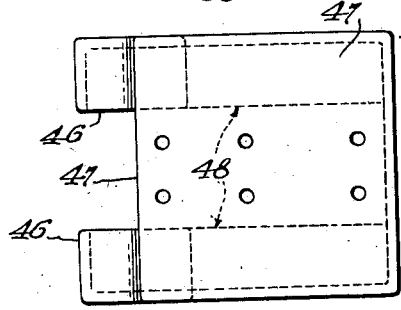
Inventor
Robin T. Weierbach
Attorney

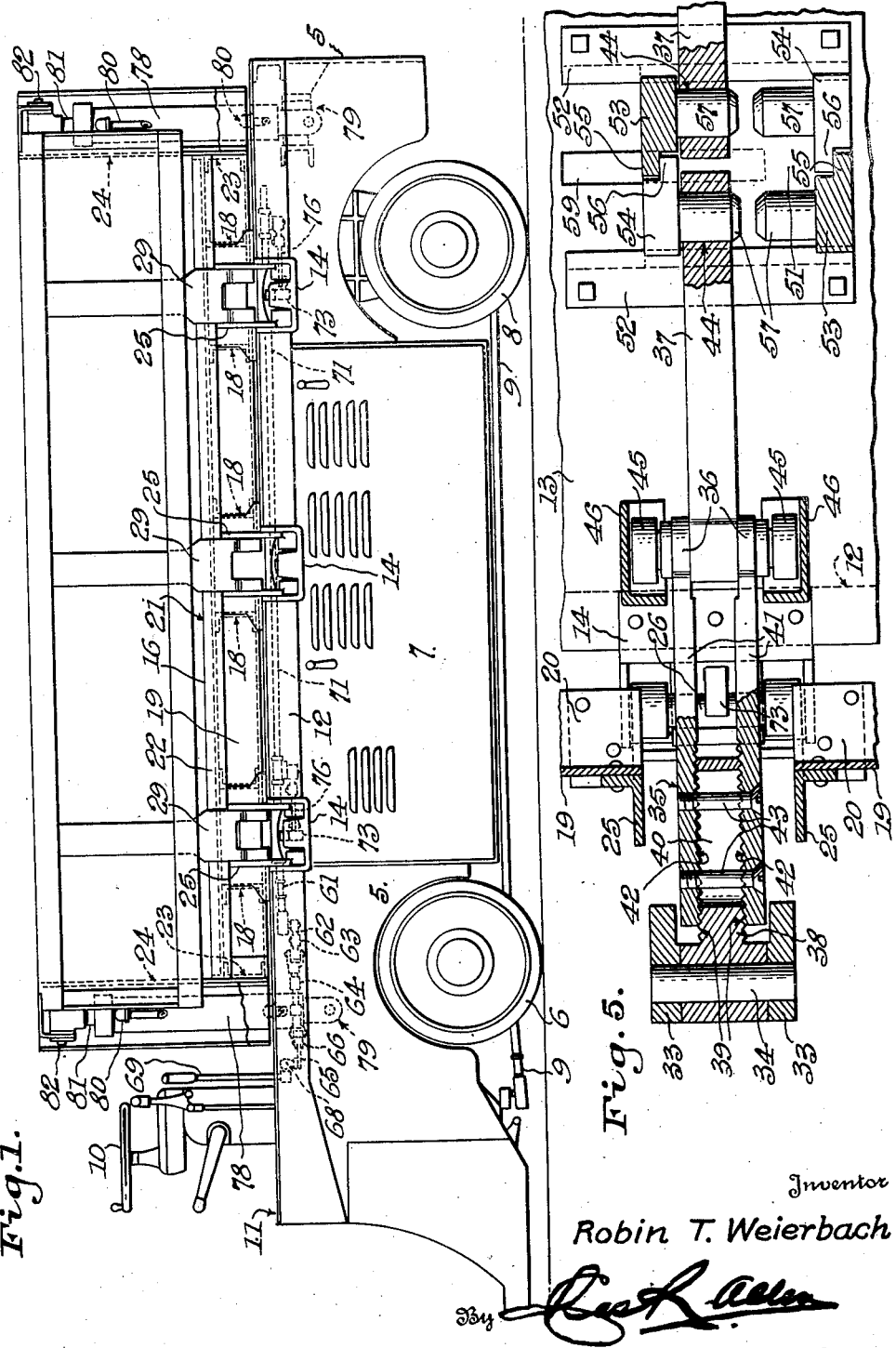

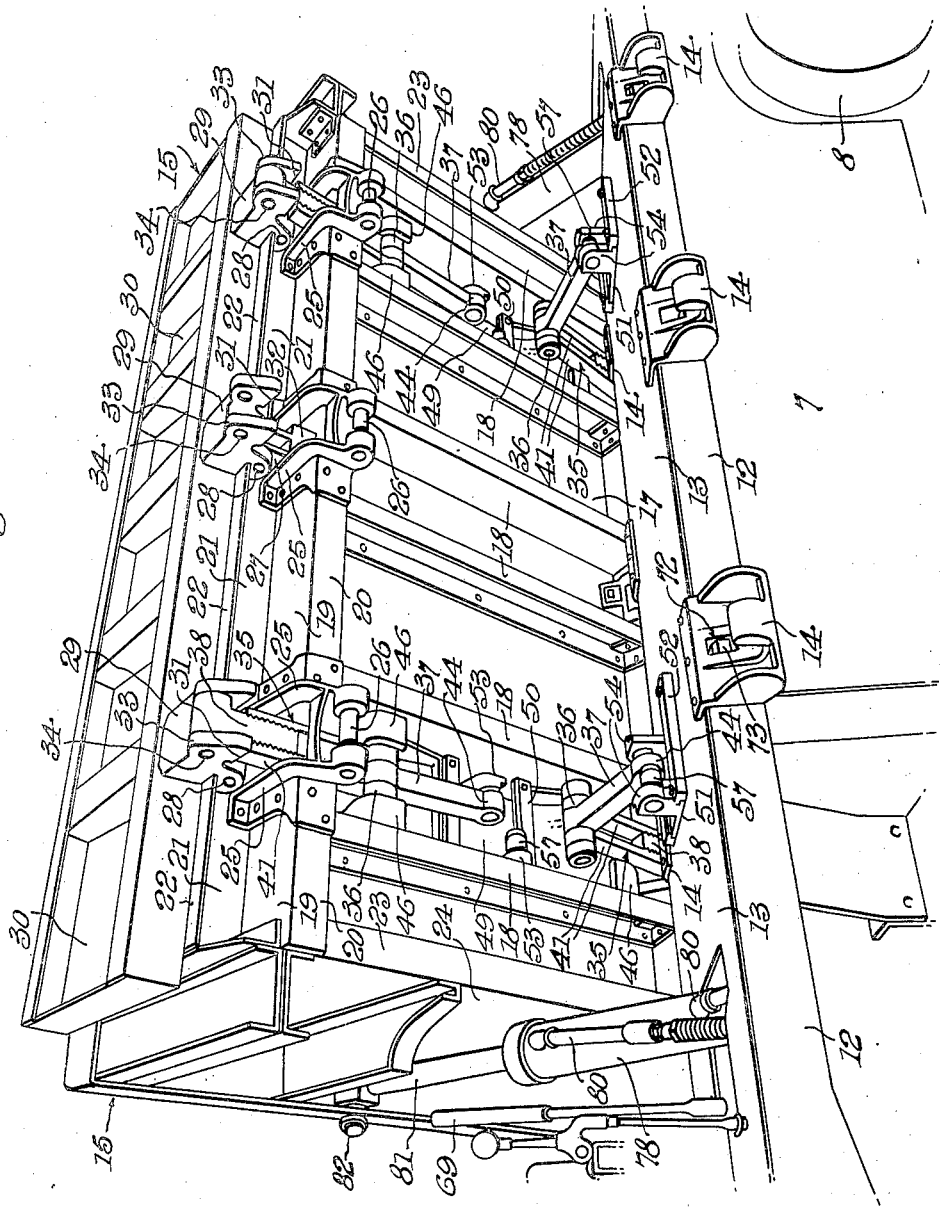

Oct. 17, 1944.    R. T. WEIERBACH    2,360,456
VEHICLE DUMP BODY MOUNTING AND DUMP DOOR ACTUATING MECHANISM
Filed March 30, 1943    5 Sheets-Sheet 4
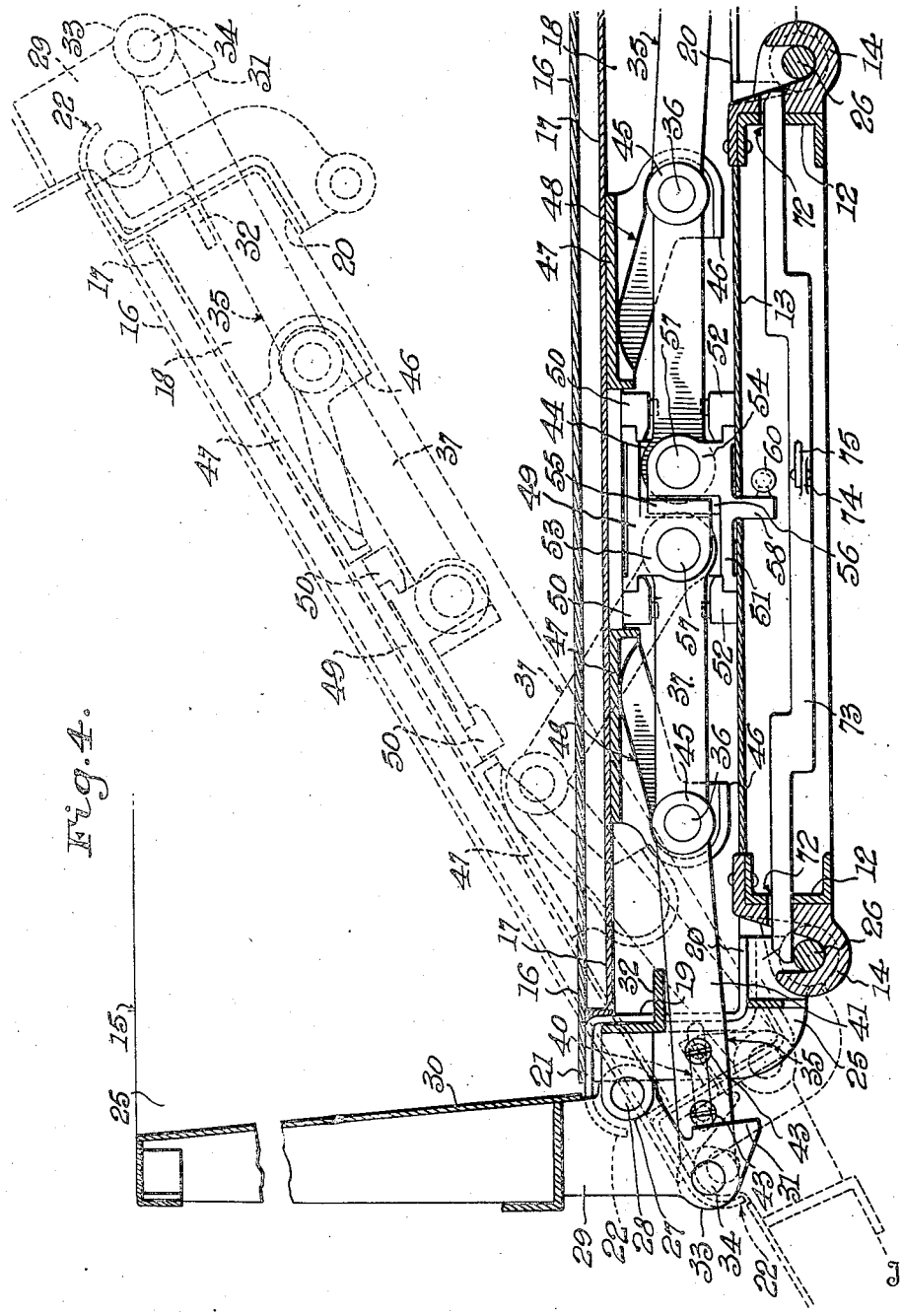
Fig. 4.
Inventor
Robin T. Weierbach
Attorney Oct. 17, 1944.   R. T. WEIERBACH   2,360,456
VEHICLE DUMP BODY MOUNTING AND DUMP DOOR ACTUATING MECHANISM
Filed March 30, 1943   5 Sheets-Sheet 5
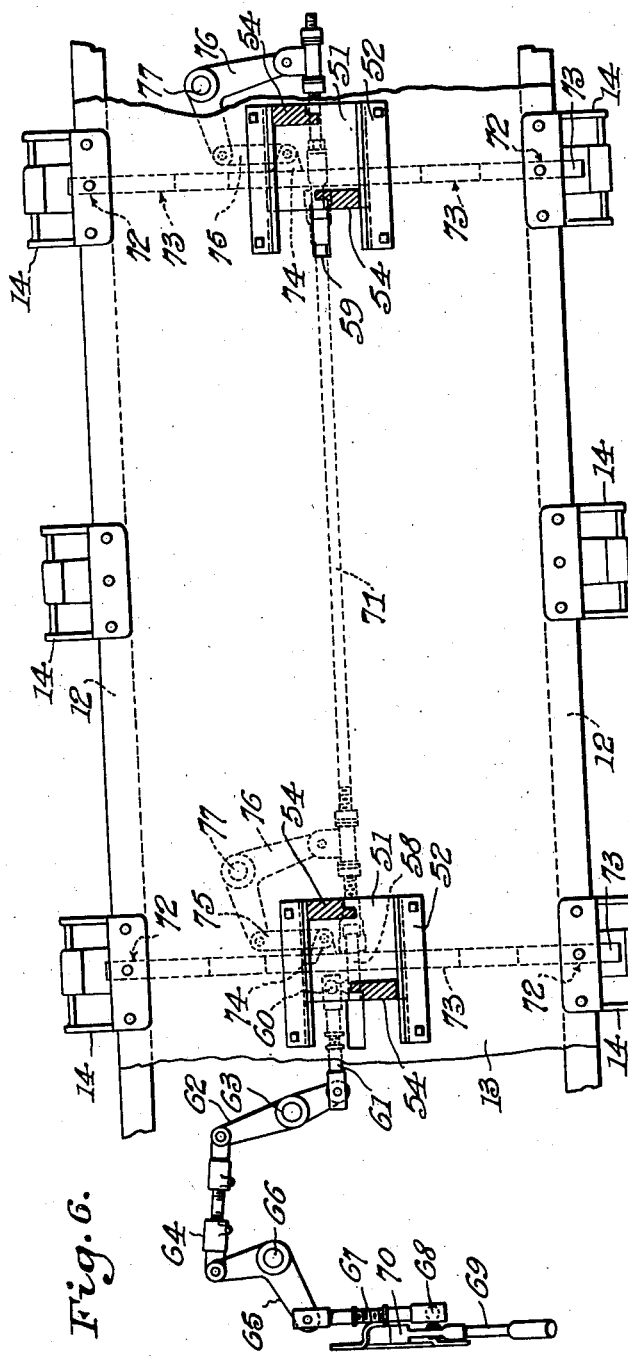
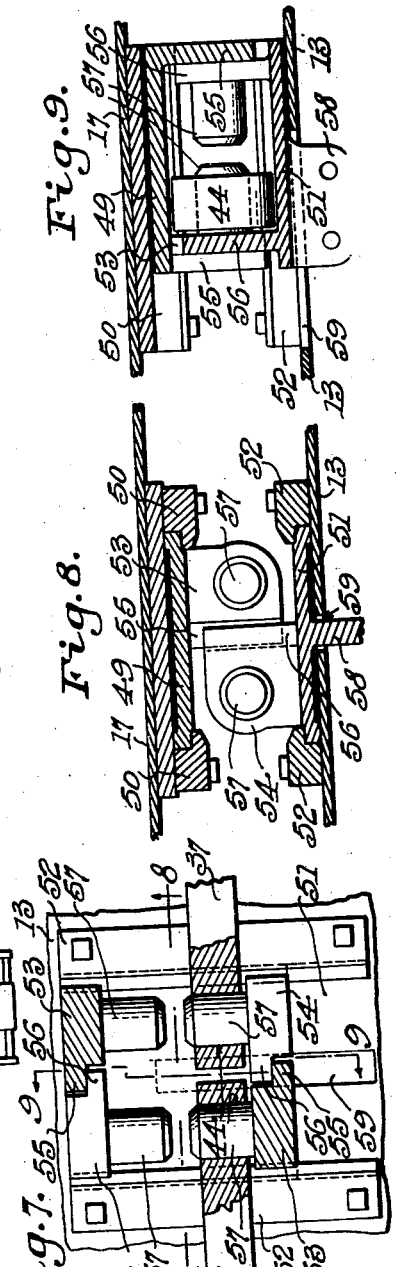
Inventor
Robin T. Weierbach Patented Oct. 17, 1944

2,360,456

UNITED STATES PATENT OFFICE 2,360,456

VEHICLE DUMP BODY MOUNTING AND DUMP DOOR ACTUATING MECHANISM

Robin T. Weierbach, Easton, Pa., assignor to Easton Car & Construction Company, Easton, Pa.

Application March 30, 1943, Serial No. 481,132

16 Claims. (Cl. 298—18)

The invention relates to certain new and useful improvements in vehicle dump bodies generally, and more particularly to dump bodies which are pivotally mounted on railway or roadway carriages for dumping to one side or the other.

An object of the invention is to provide in a dumping vehicle of the character stated novel mechanism effective upon tilting of the dump body to open or close the dump door at the dumping side accordingly as the body is being dumped or returned to normal after being dumped to one side or the other.

Another object of the invention is to provide in dump door position controlling equipment of the character stated novel means for toggle locking the dump doors in the closed position and for holding said doors co-planar with the bottom at the side to which the dumping is being effected.

Another object of the invention is to provide in a dumping vehicle of the character stated individual sets of door position controlling linkage at each side of the vehicle and novel shiftable means for effecting selective operative connection of linkage at the side of the vehicle to which the dumping is being effected and for simultaneously disconnecting from operative connection the linkage at the opposite side of the vehicle.

Another object of the invention is to provide in a dumping vehicle of the character stated shiftable linkage connection effecting means of the character stated which includes upper and lower interconnecting slides one mounted on the dump body and one on the vehicle chassis, said slides being shiftable together whereby when the lower slide is moved to selectively connect one door operating linkage set with the chassis the upper slide will be moved to free the door operating linkage set at the opposite side of the vehicle and secure it to move upwardly with the dump body.

Another object of the invention is to provide in a dumping vehicle of the character stated dumping body fulcruming equipment along each side of the dump body and comprising separable elements which interengage operatively at the side over which dumping is being effected and which are capable of separating to free the opposite side of the body for upward movement, and novel fulcrum latching equipment automatically operable by movement of said linkage selecting slides to lock the fulcruming equipment in operative interengagement at the side over which dumping is to be effected and release the fulcruming equipment at the opposite side and permit separation of the elements thereof.

Another object of the invention is to provide in a dumping vehicle of the character stated linkage and latch equipment including adjustable elements adjustable to assure proper positioning of the dumping doors in the open and closed positions.

With the above and other objects in view that will hereinafter appear, the nature of the invention will be more fully understood by following the detailed description, the appended claims, and the several views illustrated in the accompanying drawings.

In the drawings:

Figure 1 is a left side elevation of a dump vehicle embodying the invention.

Figure 2 is a rear end elevation of the vehicle illustrated in Figure 1.

Figure 3 is a detail perspective view illustrating the dump body as elevated for dumping over the right-hand side of the vehicle.

Figure 4 is a fragmentary vertical cross section through the dump body and the vehicle chassis or supporting frame structure, the body being illustrated in its normal, lowered position in full lines, and in a dumping position in dotted lines.

Figure 5 is a fragmentary horizontal sectional view illustrating one set of toggle links and the cooperative relation therewith of the shiftable link set selecting slides.

Figure 6 is a diagrammatic plan view illustrating the operating devices for the slides and the cooperatively connected pivot locking devices.

Figure 7 is a detail horizontal sectional view illustrating the slides of Figure 5 shifted to the opposite position.

Figure 8 is a detail vertical cross section taken on the line 8—8 on Figure 7.

Figure 9 is a detail vertical longitudinal section taken on the line 9—9 on Figure 7.

Figure 10 is a plan view of one of the adjustable toggle links, the component parts thereof being shown separated one from another.

Figure 11 is a detail side elevation of one of the side members of the link structure shown in Figure 10.

Figure 12 is a detail side elevation of the main body portion of the link member shown in Figure 10.

Figures 13, 14 and 15 are detail views illustrating one of the dump body carried guide brackets in plan view, end elevation, and side elevation respectively.

In the example of embodiment of the invention herein disclosed the dump vehicle is in the form of an electrically propelled roadway truck, the chassis or base frame of which is supported on steering front wheels 6 which are electrically driven in any approved manner from batteries stored in the housing 7, and on rear mounted steering wheels 8. The wheels 6 and 8 may be steered through steering connections generally designated 9 from the steering wheel 10 which is conveniently located at the operator's station generally designated 11. See Figure 1.

The base framing includes two top side channel beams 12 having top plating 13 secured thereover. To the beams 12 are secured a plurality of sets of laterally aligned open fulcrum bearings 14. See Figures 3, 4, and 6 of the drawings.

The dump body which is tiltably mounted on the base framing and generally designated 15 includes the main floor plating 16, a sub-floor 17 spaced slightly below the main floor, and plural pairs of transverse channel beams 18, each pair being aligned with one set of fulcrum bearings and adapted to engage the top plating 13 of the base framing for supporting the body on the base framing and providing a space underlying the dump body in which are mounted door actuating devices. The dump body also includes side frame pieces including longitudinal upright walls 19, inwardly turned lower horizontal flanges 20 and outwardly turned upper horizontal flanges 21 which terminate in outwardly and downwardly turned lateral edge portions 22. The dump body also includes end cross channel beams 23 to which the end wall structures 24 are secured.

Fulcrum brackets 25 secured in sets to the floor plating and beams 18 of the dump body cooperate with the open fulcrum bearings 14 carried by the base framing in tiltably supporting the dump body for dumping movement to either side of the vehicle in the manner clearly illustrated in Figures 3 and 4 of the drawings. Each fulcrum bracket 25 includes spaced ears in which is mounted the fulcrum pin 26, and these brackets also have bearing ears 27 in which is mounted a pivot pin 28 which also passes through similar ears in a pivot bracket 29 secured to the respective dump door generally designated 30, it being understood a plurality of such door mounting pivots are provided, one at the position of each bracket 25 and body fulcrum bearing 14. Each of the pivot brackets 29 also includes a stop abutment shoulder 31 disposed to be engageable with an abutment flange 32 formed on the cooperating fulcrum bracket 25 for limiting additional pivotal movement of the respective dump body door 30 after said door has reached a plane forming a substantial extension of the main bottom 16 of the body as illustrated in Figure 4.

Each door mounted bracket 29 also includes bearing ears 33 in which is secured a fulcrum pin 34, and each pin 34 forms the outer pivot connection for a toggle link set composed of an outer link member generally designated 35 and an inner link member, said outer link member being pivotally connected with the inner link member as at 36 and said inner link member being designated 37. Each outer link member is adjustable in length and includes a main body or end piece 38 having the opposite faces serrated as at 39 and equipped with an elongated slot 40. Two removable side bar members 41 cooperate with the member 38 in completing the outer link member in the manner clearly illustrated in Figures 5, 10 and 11 of the drawings.

The inner faces of the bar members 41 are serrated as at 42 for adjustably engaging the outer faces of the end piece 38, securing screws 43 being employed in the manner clearly illustrated in Figure 5 for securing the bar members 41 in assembly with the end piece 38.

Identical sets of toggle links 35, 37 are provided at opposite sides of the dump body so as to cause and control movement of the dump doors regardless of the direction of the dumping, and each such set of toggle links, or in other words the inner end extremities of the innermost links 37 which lie in close proximity in the manner clearly illustrated in Figures 4 and 5 terminate in open bearings or eye portions 44.

Each set of toggle links also is equipped with rollers 45 at the respective ends of the pivotal connection 36, and these rollers project into half circular flange seats 46 in a guide and control bracket 47 secured to the underface of the dump body sub-bottom 17. See Figures 3, 4 and 13 to 15. The flange seats 46 serve to prevent free upward or downward movement of the toggle links when the dump body is in the lowered, normal position illustrated in full lines in Figure 4. Each bracket 47 includes door opening control guide surfaces or flanges 48 which are engaged by the linkage rollers 45 during lifting or lowering of the dump body, this contact relation being maintained during the lifting of the body until the respective door abutments 32 engage the cooperating bracket abutment flanges 31 whereupon the dump body and the door structure no longer partake of relative movement, after which the rollers move out of contact with the bracket 47.

Cooperative with each double set of toggle links, that is, the set of links at each side of the vehicle and having their inwardly directed, open bearing or eye portions 44 disposed in adjacent relation in the manner clearly illustrated in Figures 4 and 5 is an upper slide 49 guided for longitudinal shifting movement as at 50 on the sub-floor 17 of the dump body, and a lower slide 51 similarly guided as at 52 on the base frame top plate 13. Each upper slide 49 is provided with two ears 53 depending from diagonally opposite corner portions thereof, and each lower slide is equipped with two ears 54 projecting upwardly from the other diagonally opposite corner so that one lower and one upper ear lie side by side in the manner clearly illustrated in Figures 5 and 7 of the drawings. Each upper slide is provided with outer depending flange extensions 55 which overlap similar inner flange extensions 56 on the cooperating lower slide in the manner clearly illustrated in Figures 5 and 7 to 9 of the drawings, thereby providing for interengagement or interlocking of the upper and lower slides whenever the dump body is in the lowered position illustrated in Figures 4, 8 and 9 so that shifting movement imparted to one slide will be transmitted to the other slide. Each ear 53 or 54 has a fulcrum pin 57 projecting therefrom, the pin of each upper ear being disposed in axial alignment with the pin of the opposite lower ear when the dump body is in its lowered position as will be evident by reference to Figures 4, 5, 7 and 8 of the drawings. The purpose of this axial alignment of pins 57 will become apparent as the description progresses.

An actuator ear 58 depends from the foremost of the two lower slides 51 and extends downwardly through an accommodating slot 59 in the top plate 13 of the base framing and the ear 58 is equipped with a ball extension 60 beneath said plate. The ball extension 60 is connected by an adjustable thrust rod 61 to one end of a rocker lever 62 which is pivoted intermediate its ends as at 63 on the base frame. The other end of the lever 62 is connected to an adjustable thrust rod 64 which is in turn connected to one arm of a bell crank lever 65 which is fixedly pivoted as at 66. The other arm of the bell crank lever 65 is connected to one end of an adjustable thrust rod 67 which is in turn connected at 68 to an actuator lever 69 fixedly pivoted as at 70 in position for being conveniently grasped and actuated by the operator from his operating station 11. The rearmost lower slide 51 also is equipped with a depending actuator ear similar to the previously described slide ear 58, and these slide ears are connected by an adjustable thrust rod 71 in the manner clearly illustrated in Figure 6. It will thus be apparent that by actuating the lever 69 the oscillatory movement thereof will be transmitted in the form of longitudinal shifting or slide movement of the bottom slides 51, and as before stated the movement of the bottom slides will be transmitted to the upper slides 49 whenever the dump body is in its normal, lowered position as illustrated in Figures 4, 8 and 9 of the drawings.

The body fulcruming bearings 14 are equipped with slide bearings 72 for accommodating the ends of lock bars 73, one such bar being provided for cooperation with each set of bearings 14 mounted at opposite sides of the vehicle in the manner clearly illustrated in Figure 6. Each lock bar 73 is equipped with an actuator ear 74 and each ear 74 is link connected at 75 with one arm of a bell crank lever 76 fixedly pivoted as at 77 and having its other arm connected to the thrust rod 71 so that each time the thrust rod is shifted in one direction or the other by manipulation of the control lever 69, both lock bars 73 will be shifted to one side or the other. When the lock bars 73 are shifted to the left, or downwardly as viewed in Figure 6 they will overlie the fulcrum pins 26 at the left-hand side of the vehicle and will be displaced from locking relation over the fulcrum pins 26 at the opposite side of the vehicle in the manner clearly illustrated in Figure 4. It is to be understood that the fulcrum pins at the side of the vehicle over which dumping is to be effected are locked in their fulcrum bearings 14 by the lock bars 73, and the proper shifting of the lock bars is automatically accomplished as an incident to the proper shifting of the cooperating upper and lower slides 49 and 51.

A hydraulic lift unit is provided at each end of the dump body, and each unit includes a cylinder 78 pivoted as at 79 to the base frame, and upper and lower hydraulic duct connections 80 for causing and controlling upward or downward movement of the actuating plunger 81 which is pivotally connected at top center as at 82 to the respective end of the dump body.

Operation

Assuming the dump body 15 to be in the normal, lowered position illustrated in full lines in Figure 4 and that the operator wishes to dump lading over the right hand side of the vehicle as illustrated in full lines in Figure 3 and in dotted lines in Figure 4, he would grasp the slide operating handle 69 and shift the slides forwardly to the positions illustrated in Figures 3, 4 and 5 thereby causing the lower slide pins 57 toward the dumping side or right to enter the eyes 44 of the links 37 at said right side and thus pivotally secure them to the base framing 12, 13 so that when the dump body is lifted the linkage sets at the dumping side of the vehicle will operate to control the position of the door at said dumping side. This same movement of the slides causes the other pins 57 of the lower slides, those toward the opposite side of the vehicle, to move out of the eyes 44 of the links at said opposite side and free them from their previous connection with the base framing. This same movement of the slides causes the pins 57 at the right side of the upper slides to move out of the eyes 44 of the links 37 at said right side and the pins 57 at the opposite side of said upper slides to move into the eyes 44 of the links 37 at said opposite side and thus secure said last named links so that they can move idly upwardly with the dump body during the dumping over the right side.

The operator then actuates the controls of the lift cylinders 78 to lift the dump body as shown in Figure 3. As the body moves upwardly the bracket seats 46 break the toggles and cause the links 37, 35 to break upwardly as shown in dotted lines in Figure 4, thereby pulling inwardly on the door 30 below its pivotal mountings 28 and opening the same. The bracket surfaces 48 control the opening of the door, by reason of the contact with the linkage rollers 45 until the door abutments 31 engage the abutment shoulders 32 of the body whereupon the movement of the door relative to the dump body ceases and the body and door move as one in the relation shown in dotted lines in Figure 4, the linkage rollers 45 then moving free of contact with the control surfaces 48 of the brackets 47.

On the return or lowering movement of the dump body the linkage action is reversed and after the lowering bracket surfaces again contact the linkage rollers 45 they push the links 37, 35 down to their toggle lock position shown in full lines in Figure 4 and in doing so force the dump door 30 upwardly to the closed position shown in full lines in said Figure 4.

It should be obvious that by reversing the direction of shifting movement of the slides 49, 51 the performance of connecting and releasing linkage eyes 44 above described will be reversed, that is, the link eyes 44 at the left side of the vehicle over which dumping now is to be effected will be pivotally connected to the base frame by the appropriate slide pins 57 and the link eyes 44 at the right side will be connected to the dump body to move idly therewith.

It will be apparent by reference to Figures 4 and 6 that the lock bars 73 will be moved simultaneously with the shifting of the slides 49, 51 to automatically engage over and lock in place the dump body pivot pins 26 at the side over which dumping is to be effected and at the same time move away from and release the pivot pins 26 at the opposite side to permit them to move up with the dumping body.

It is of course to be understood that the details of structure and the arrangement of parts may be variously changed and modified without departing from the spirit and scope of the invention.

I claim:

1. In a dump vehicle, a mobile chassis frame, a dump body tiltably mounted on said frame for dumping movement to effect dumping of lading over either side of the vehicle, a hingedly mounted door at each side of the body, a set of linkage connected with each door and selectively connectible to the frame or to the body to effect opening and closing of the respective door as the body is dumped to the respective side and then lowered to normal or to move ineffectively with said body when being dumped to the opposite side and lowered to normal, and means operable for so selectively connecting said linkage sets to said frame or body.

2. In a dump vehicle, a mobile chassis frame, a dump body tiltably mounted on said frame for dumping movement to effect dumping of lading over either side of the vehicle, a hingedly mounted door at each side of the body, a set of linkage connected with each door and selectively connectible to the frame or to the body to effect opening and closing of the respective door as the body is dumped to the respective side and then lowered to normal or to move ineffectively with said body when being dumped to the opposite side and lowered to normal, means operable for so selectively connecting said linkage sets to said frame or body, and means operable simultaneously with said selective connecting means for locking the body on its pivotal mounting at the side over which dumping is to be effected and for freeing the pivotal mounting at the opposite side to permit said opposite side to move upwardly away from the chassis frame.

3. A dump vehicle structure as defined in claim 1 in which said linkage connecting means comprises slide means shiftable in one direction to connect the linkage at the side over which dumping is to be effected to the frame and simultaneously release the linkage at the opposite side and connect it to the body.

4. A dump vehicle structure as defined in claim 1 in which said linkage connecting means comprises slide means shiftable in one direction to connect the linkage at the side over which dumping is to be effected to the frame and simultaneously release the linkage at the opposite side and connect it to the body, and in which said tiltable mounting for the body comprises open fulcrum rest means carried at each side by the frame and fulcrum pins carried at each side by the body and freely receivable in said rest means, and in which there is included locking devices connected for movement with the slide means to lock the fulcrum pin on its receiving seat at the side over which dumping is to be effected and simultaneously release the pin at the opposite side for free movement away from its seat.

5. A dump vehicle structure as defined in claim 1 in which said linkage connecting means comprises slide means shiftable in one direction to connect the linkage at the side over which dumping is to be effected to the frame and simultaneously release the linkage at the opposite side and connect it to the body, and in which said tiltable mounting for the body comprises open fulcrum rest means carried at each side by the frame and fulcrum pins carried at each side by the body and freely receivable in said rest means, and in which there is included a laterally shiftable lock bar connected for movement with the slide means to place one end thereof over the pin at the side over which dumping is to be effected to lock it on its seat and simultaneously displace the other end thereof from over the pin at the opposite side to free the latter pin for movement away from its seat.

6. A dump vehicle structure as defined in claim 1 in which said linkage connecting means comprises a slide mounted on the body and movable fore or aft for connecting one door connected linkage and simultaneously releasing the opposite door connected linkage, a slide mounted on the frame and movable fore or aft for connecting one door connected linkage and simultaneously releasing the opposite door connected linkage, and means releasably connecting the slides for movement together when the body is in its normal position lowered on said frame.

7. A dump vehicle structure as defined in claim 1 in which said linkage connecting means comprises a slide mounted on the body and movable fore or aft for connecting one door connected linkage and simultaneously releasing the opposite door connected linkage, a slide mounted on the frame and movable fore or aft for connecting one door connected linkage and simultaneously releasing the opposite door connected linkage, and means releasably connecting the slides for movement together when the body is in its normal position lowered on said frame, and in which is included means operable by movement of the frame mounted slide for locking the body on its pivotal mounting at the side over which dumping is to be effected and for freeing the pivotal mounting at the opposite side to permit said opposite side to move upwardly away from the chassis frame.

8. A structure as defined in claim 1 in which each linkage set is adjustable as to length so as to enable accurate determination of the position of the connected door relative thereto.

9. In a dump vehicle, a door position controlling link of variable length comprising, a solid end piece having a pivot eye and oppositely disposed serrated side faces, a pair of opposed side pieces having pivot eyes at one end and serrated faces at their opposite ends adjustably engageable with the serrated faces of the solid end piece, and means for securing the side pieces against the solid end piece.

10. In a dump vehicle, a mobile chassis frame, a dump body tiltably mounted on said frame for dumping movement to effect dumping of lading over either side of the vehicle, a hingedly mounted door at each side of the body, a set of linkage connected with each door and selectively connectible to the frame or to the body to effect opening and closing of the respective door as the body is dumped to the respective side and then lowered to normal or to move ineffectively with said body when being dumped to the opposite side and lowered to normal, means operable for so selectively connecting said linkage sets to said frame or body, means operable simultaneously with said selective connecting means for locking the body on its pivotal mounting at the side over which dumping is to be effected and for freeing the pivotal mounting at the opposite side to permit said opposite side to move upwardly away from the chassis frame, and means for adjusting the relation of the linkage selecting means to the pivotal mounting locking means.

11. In a dump vehicle, a mobile chassis frame, a dump body tiltably mounted on said frame for dumping movement to effect dumping of lading over either side of the vehicle, a hingedly mounted door at each side of the body, a toggle link set beneath the body for opening and closing and controlling the position of each door, the links of each toggle set being pivotally connected together centrally and pivotally connected to the respective door at its other end and terminating inwardly beneath the center of the body in an open pivot eye, actuating roller means at each central link pivot connection, a slide bracket secured to the body in position for being engaged by each roller means for moving the respective links and controlling the opening and closing of the respective door, and means for effecting a selective pivotal connection of each open pivot eye with the frame or the body to operatively connect linkage sets with the frame only at the side over which dumping is to be effected.

12. In a dump vehicle, a mobile chassis frame, a dump body tiltably mounted on said frame for dumping movement to effect dumping of lading over either side of the vehicle, a hingedly mounted door at each side of the body, a toggle link set beneath the body for opening and closing and controlling the position of each door, the links of each toggle set being pivotally connected together centrally and pivotally connected to the respective door at its other end and terminating inwardly beneath the center of the body in an open pivot eye, actuating roller means at each central link pivot connection, a slide bracket secured to the body in position for being engaged by each roller means for moving the respective links and controlling the opening and closing of the respective door, and manually shiftable means movable in one direction to operatively connect one open link eye with the frame and simultaneously release the open link eye at the opposite side of the vehicle from said frame and movable in the opposite direction for releasing said one open link eye from the frame and simultaneously operatively connecting said opposite open link eye to the frame.

13. In a dump vehicle, a mobile chassis frame, a dump body tiltably mounted on said frame for dumping movement to effect dumping of lading over either side of the vehicle, a hingedly mounted door at each side of the body, a toggle link set beneath the body for opening and closing and controlling the position of each door, the links of each toggle set being pivotally connected together centrally and pivotally connected to the respective door at its other end and terminating inwardly beneath the center of the body in an open pivot eye, actuating roller means at each central link pivot connection, a slide bracket secured to the body in position for being engaged by each roller means for moving the respective links and controlling the opening and closing of the respective door, and manually shiftable means movable in one direction to operatively connect one open link eye with the frame and simultaneously release the open link eye at the opposite side of the vehicle from said frame and movable in the opposite direction for releasing said one open link eye from the frame and simultaneously operatively connecting said opposite open link eye to the frame, said last named means comprising a slide shiftable longitudinally on the frame and having thereon two reversely directed pivot pins disposed in cooperative relation to the link set pivot eyes at opposite sides of the vehicle so that when the slide is shifted one way one pin will move into one pivot eye and form a pivot therefor and the other pin will move out of the opposite pivot eye and free it from pivotal connection with the frame, and when said slide is shifted in the opposite direction said one pin will move out of and release said one pivot eye from the frame and the other pin will move into said opposite pivot eye and form a pivot therefor.

14. A structure as defined in claim 13 in which there is included means for connecting each toggle link eye freed from the frame to the body so that that particular set of toggle links can move upwardly with the body.

15. A structure as defined in claim 13 in which there is included a second slide shiftable on the body and having thereon two reversely directed pivot pins disposed in cooperative relation to the link set pivot eyes at opposite sides of the vehicle so that when said second slide is shifted one way or the other one of its pins will move into the link pivot eye which has just been freed by shifting of the first slide so as to connect the particular link set to the body for upward movement therewith.

16. In a dump vehicle, a mobile chassis frame, a dump body tiltably mounted on said frame for dumping movement to effect dumping of lading over either side of the vehicle, a hingedly mounted door at each side of the body, a toggle link set beneath the body for opening and closing and controlling the position of each door, the links of each toggle set being pivotally connected together centrally and pivotally connected to the respective door at its other end and terminating inwardly beneath the center of the body in an open pivot eye, actuating roller means at each central link pivot connection, a slide bracket secured to the body in position for being engaged by each roller means for moving the respective links and controlling the opening and closing of the respective door, and means for effecting a selective pivotal connection of each open pivot eye with the frame or the body to operatively connect linkage sets with the frame only at the side over which dumping is to be effected, said last named means comprising a slide shiftable longitudinally on the frame and having thereon two reversely directed pivot pins disposed in cooperative relation to the link set pivot eyes at opposite sides of the vehicle so that when the slide is shifted one way one pin will move into one pivot eye and form a pivot therefor and the other pin will move out of the opposite pivot eye and free it from pivoted connection with the frame, and when said slide is shifted in the opposite direction said one pin will move out of and release said one pivot eye from the frame and the other pin will move into said opposite pivot eye and form a pivot therefor, a second slide shiftable on the body and having thereon two reversely directed pivot pins disposed in cooperative relation to the link set pivot eyes at opposite sides of the vehicle so that when said second slide is shifted one way or the other one of its pins will move into the link pivot eye which has just been freed by shifting of the first slide so as to connect the particular link set to the body for upward movement therewith and the other of its pins will move out of and free from the body the link pivot which has just been pivotally connected to the frame by shifting of the first slide, and lug means carried by the two slides and interengageable when the dump body is at rest on the frame for causing both slides to move together to simultaneously perform their link eye connecting and releasing functions.

ROBIN T. WEIERBACH.